UNITED STATES PATENT OFFICE.

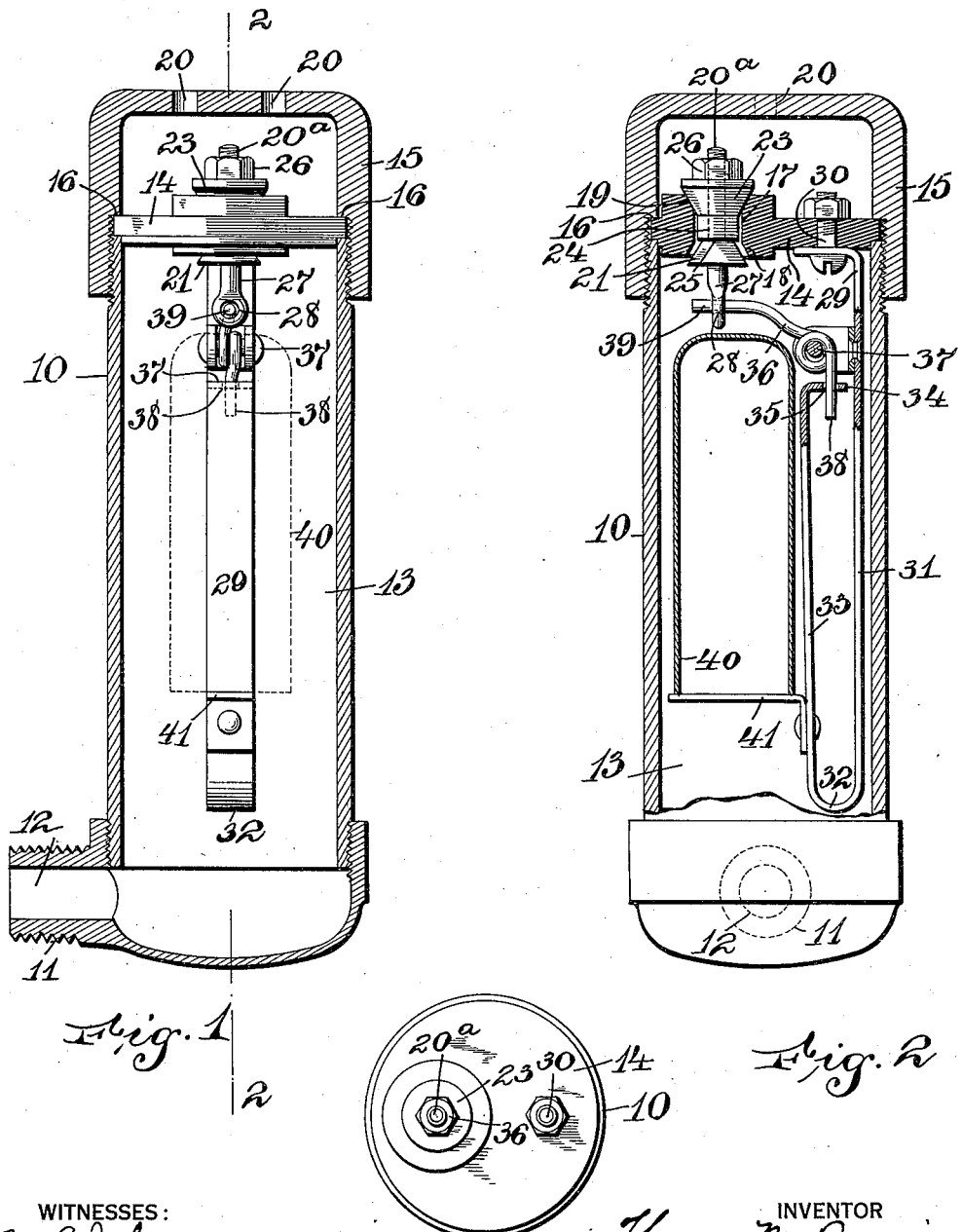

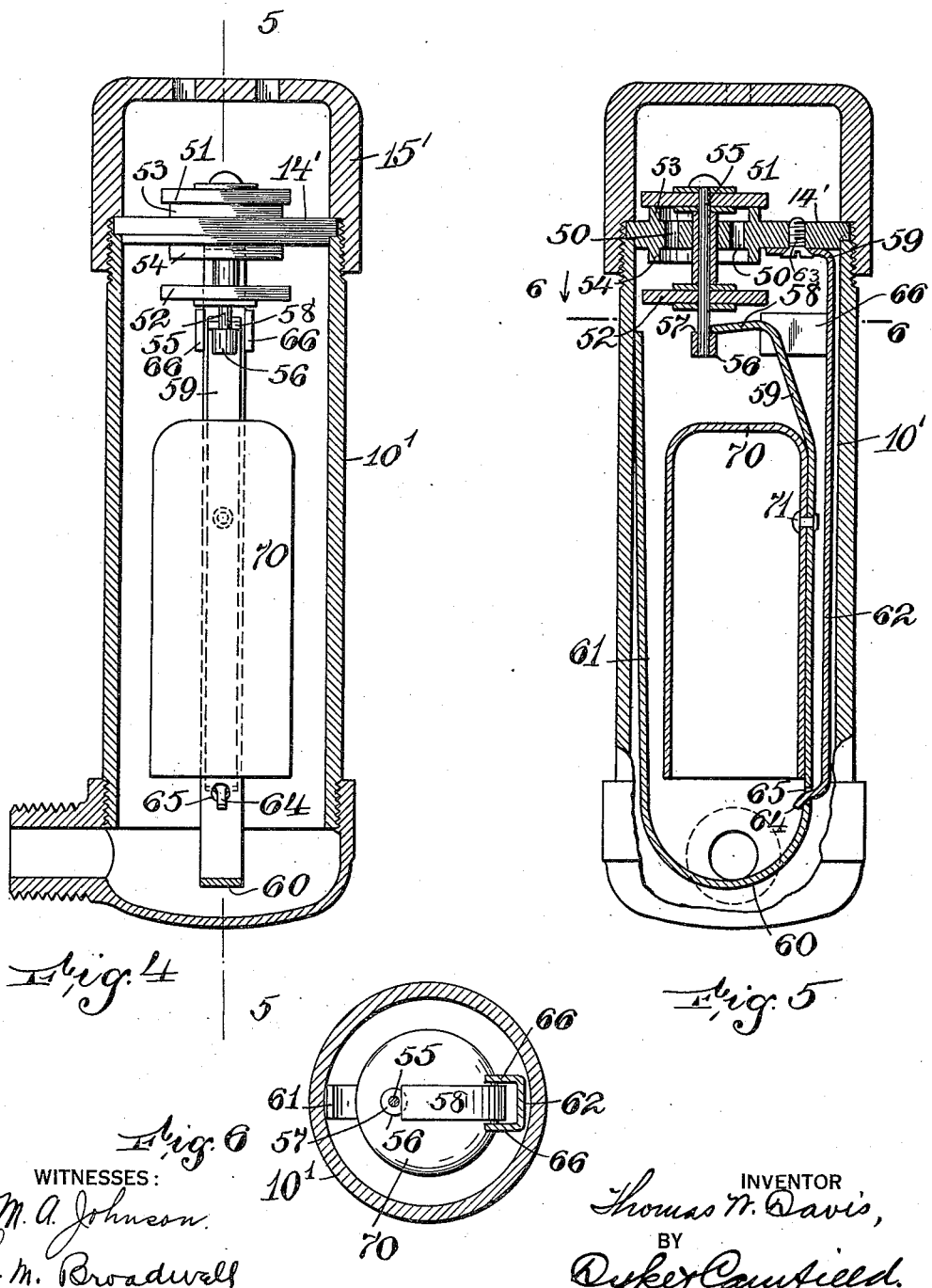

THOMAS W. DAVIS, OF ELIZABETH, NEW JERSEY.

PRESSURE-CONTROLLING VALVE.

1,154,385.  Specification of Letters Patent.  Patented Sept. 21, 1915.

Application filed August 6, 1914. Serial No. 855,382.

*To all whom it may concern:*

Be it known that I, THOMAS W. DAVIS, a citizen of the United States, and a resident of Elizabeth, county of Union, and State of New Jersey, have invented certain new and useful Improvements in Pressure-Controlling Valves, of which the following is a specification.

My invention relates to pressure controlling valves, and more especially to valves for controlling radiator vents in heating systems, though valves in accordance with my invention may be used for other purposes.

Radiator vent valves for steam heating systems must answer several important requirements. They must permit the free escape of air or vapor when the steam is turned on or the engineer is "getting up pressure"; when the radiator is hot they must effectually close the vent and prevent the escape of steam; when, for any reason, water is present in the radiator and seeking to escape therefrom, they must close the vent to prevent the escape of water into the room or other place where the radiator is located, and when the interior pressure is lowered below atmospheric pressure they should desirably close the vent to prevent the access of air into the heating system, which otherwise will have to be expelled again before steam can be gotten into the radiator to heat it up. A valve in accordance with my invention meets all these requirements automatically and in a satisfactory manner, and in addition is simple and can be cheaply constructed and will not get out of order or require attention over long intervals. I obtain these desirable results by the provision of a valve plate exposed to the air on one side, and having a space on the opposite side communicating with the interior of the radiator or other apparatus the pressure whereof is to be controlled, and having a vent or vents therein with a valve seat on each side of the plate and a valve stem passing through the valve plate and having a valve on each end, the outside valve acting as a check valve to prevent the ingress of outside gases, as atmospheric air, into the radiator and heating system, but not interfering with the outward passage of gases, water or vapor from the interior of the radiator, and the inside valve on the same stem being normally held off its seat and thus permitting the outward passage of gas or vapor while pressure is being raised or before the apparatus becomes hot, but which is permitted to seat or is positively forced onto its seat by means provided for that purpose when the radiator and the escaping gases become heated or when water is present in the valve chamber. Of course, in either of the two situations last referred to, the inside valve being closed and held closed by pressure from the inside in excess of atmospheric pressure, while the outside valve is unseated, there is no opportunity for air to enter, as it would have to overcome a pressure greater than atmospheric pressure. In this manner an extremely efficient operation of the heating system is assured, since neither steam nor water can escape, and all ingress of gases, as atmospheric air, into the heating system through the vent opening of the radiator is prevented, and the radiator can be heated up much more quickly than when air is admitted to fill the radiator pipes and system through the vent when the pressure is reduced, as is the customary practice.

With the foregoing and related objects in view, my invention consists in the parts, improvements and combinations herein set forth and claimed.

In the accompanying drawings I have shown, for the purposes of illustration, certain forms of valve mechanism in which my invention may be embodied.

In the said drawings, forming a part of this specification, and wherein the same reference numerals are used to designate the same parts throughout, Figure 1 is a view partly in central vertical cross-section of a radiator valve and casing embodying one form of my invention, Fig. 2 is a similar view with the sectional portion thereof taken substantially on the line 2—2, Fig. 1, Fig. 3 is a top plan view of the valve plate of Fig. 1 and connected parts, Fig. 4 is a view similar to Fig. 1, but showing a modified form of apparatus, Fig. 5 is a sectional view taken on the line 5—5, Fig. 4, and Fig. 6 is a cross-sectional view taken on the line 6—6, Fig. 5, and looking in the direction of the arrow on Fig. 5.

In the form shown in Figs. 1, 2 and 3, positively acting closing means for the valve controlling the vent opening are provided.

Reference numeral 10 is applied to designate the body part of the valve casing, which, as is usual, is connected with a tapped opening in the radiator by the screw shank 11, having a passage 12 communicating with the opening 13 in the valve casing. The vent and valve seat plate 14, which is preferably of hard rubber, though other materials may be used, is mounted in any manner which will put it into communication with the outside atmosphere on one side, and the interior of the valve casing communicating on the opposite side with the interior of the radiator or other apparatus the pressure whereof is to be controlled. As shown, it is seated on the top of the casing and is held in place by the cap 15, threaded to screw on the casing 10 and having a shoulder 16 between which and the end of the casing 10 the valve plate 14 is securely held, and in such manner as to make a tight joint.

In the plate 14, and preferably a little at one side of the center thereof, is a vent hole 17, and in the form shown in Figs. 1, 2 and 3 this vent opening 17 is enlarged at its end to form inner and outer valve seats 18 and 19, preferably conical in form, as shown.

The interior of the cap 15 is placed into communication with the outer atmosphere, as by the provision of the openings 20, 20 therein. The valve stem 20ᵃ is passed loosely through the vent opening 17 and is arranged with valves on each side of the valve plate 14. As shown, the interior valve 21 is formed integrally with the valve stem 20ᵃ, and the valve 23 is perforated to receive the stem 20ᵃ and has the sleeve 24 formed integrally therewith. The sleeve 24 rests against the shoulder 25 on the stem 20ᵃ, and all the parts are held together by a nut 26 screwed on the outer end of the stem 20ᵃ. It will readily be apparent that other structures may be used to produce a double ended valve.

On the lower end of the valve structure, and as shown formed integrally with the valve stem 20ᵃ and the valve 21, means for connecting the controlling and operating device with the valve structure are provided, and in the form shown the same consists of a downwardly extending lug 27 with an opening 28 formed therein.

The parts described comprise all the parts of the valve structure proper.

It will be seen that when the control apparatus does not come into play the outer valve 23 rests on its seat 19 and acts as a check valve for preventing the passage of air into the valve casing and permitting the passage of gas, air or vapor therefrom, if the pressure on the interior rises above that on the exterior. The control apparatus, under such circumstances, prevents the closing of the valve 21, as will be explained.

The control apparatus serves to prevent the seating of the valve 21 while cool air or vapor is being discharged, and also serves to cause or permit the seating of the valve 21, at the same time unseating the valve 23, and such control apparatus involves heat actuated and water actuated devices. The heat actuated device comprises the thermostat strip 29, here shown of U-form, and attached at one end to the plate 14, as by means of the screw 30, and having a downwardly extending arm 31, a bend 32, an upwardly extending arm 33 arranged adjacent to the downwardly extending arm 31, and a short reverse bend 34 having an opening 35 therein. The expansion of the metal of the thermostat is effective to separate the arms 31 and 33 of the U, as will be readily understood, and means are provided for utilizing this expansion and the separating action of said arms to close the valve 21. In the form shown, such means comprise a bell crank lever 36 pivoted at 37, such pivotal connection being preferably made to the thermostat metal near where the same is connected with the plate 14, though the pivotal connection may be otherwise made, so long as the bell crank lever is movable with the plate 14 to thereby facilitate the assembly of the parts. Such bell crank lever has an arm 38 entering the opening 35 in the part 34 of the thermostat strip and an arm 39 on the opposite end loosely received in the opening 28 in the lug 27 on the valve stem 20ᵃ. As will be evident, the expansion of the thermostat strip 29, as takes place, for instance, when steam is admitted into the valve casing 10, results in the closing of the valve member 21 by the action of the bell crank lever 36. It will be understood that if water enters the casing 10, if the water is hot, the valve remains closed by the thermostatic action. Means are also provided so that the presence of cold water in the casing 10 results in the closing of the valve 21. For this purpose a float 40 is provided, preferably open at its bottom, but otherwise air-tight.

The outer arm 33 of the thermostat strip 29 is preferably provided with a projecting member, as 41, for confining the float 40 generally to its proper position in the apparatus and providing for the convenient insertion and removal of all the valves and valve controlling parts, by means of the plate 14, to which the thermostatic controlling means are attached. When water enters the float chamber 10 the float 40, with the air contained therein, rises, and coming in contact at its upper end with the lower end of the lug 27, serves to close the valve 21, and if there is pressure present with the water, such pressure reinforces the action of the rising float 40 and holds the valve 21 closed, thus preventing the escape of water through the vent opening. It will be understood that the thermostat strip 29 is comparatively light and comparatively easily bent, and that therefore the tendency of the same to hold the valve 21 open when the thermostat is not expanded by heat, is overcome by the flotative pressure of the float 40, but that unless the float 40 is raised, due to the presence of water in the chamber 10, and while cold air or vapor is escaping from the interior of the radiator, the valve 21 is lightly held down by the arm 38 of the bell crank lever 34 and the thermostat strip 29, and that such slight excesses of pressure above the atmospheric pressure, as occurs at such times, will not be sufficient to close the valve 21 against such retarding effect.

In the form of device shown in Figs. 1, 2 and 3 the bell crank 36 is made of spring material which is stiff enough to operate the valves 21 and 23 in a positive manner, but it has a degree of resiliency which prevents straining of the thermostatic means in case the device is subjected to a degree of temperature beyond the point where it is normally expected to operate. In other words, if a very high degree of temperature, caused by greater steam pressure for instance, affects the thermostatic strip, the strip expands to the point where it closes the valve 21 by means of the bell crank, and the further movement of the thermostatic strip is permitted by the spring action or yielding property of the bell crank which will permit such excessive movement of the thermostatic strip without distorting the strip.

In Figs. 4, 5 and 6 I have illustrated a modified form of valve and valve control structure. In the form here illustrated, the plate 14' is provided with annular valve seats 53 and 54 surrounding the vents 50 on each side of the valve plate, and the valve stem is provided with flat valves 51 and 52, coacting with such valve seats 53 and 54. The particular form of valve and valve seats, however, may be varied, and valves and valve seats, such as are used in the form shown in Figs. 1, 2 and 3, may be made use of in this connection, if desired, as well as other forms of valves and valve seats. In this structure means are not provided for positively closing the inner valve 52, but means are provided for preventing such valve from closing when cold air or vapor is to be discharged from the float chamber 10', but when hot steam or gases are present in the float chamber, or there is water therein, the means for preventing the closing of the valve 52 are put out of action and the valve 52 is free to be closed by the excess pressure in the interior of the valve casing over the atmospheric pressure. This result is obtained by the provision of a stop on the lower end of the valve stem 55, which stop may have the form of an enlargement 56 of the valve stem 25 on the lower end thereof and extending therearound, leaving the shoulder 57 at the junction thereof with the principal part of the valve stem 55. The means for preventing the closing of the valve comprise such stop and a member coacting therewith, and in the form shown such coacting member consists of a hook 58 on the upper end of the thermostat strip 59, which comprises, in addition to the hook 58, a downwardly extending arm 59, a bend 60 and an upwardly extending arm 61, and such thermostat member is pivotally supported in the valve casing preferably at one side of the center thereof and near the lower end thereof. In the form shown it is pivoted on the arm 62 secured to the plate 14', as by a screw 63, and having a pivoting tongue 64 entering an opening 65 in the downwardly extending arm 59 of the thermostat strip. Said supporting member 62 is preferably provided with side guiding members 66 for retaining the thermostat strip in substantial parallelism thereto, and the upwardly extending arm 61 of the thermostat strip is sufficiently separated from the downwardly extending arm 59 thereof so that the same may extend close to and into contact with the wall of the casing 10' on the side opposite the pivotal support of the thermostat. When the thermostat is subjected to the action of heat, as by the presence of steam in the casing 10', the arms thereof separate as before, thus bringing the hook member 58 away from the stem 55 and stop member 56, and leaving the valve stem free from said hook portion 58 and the valve 52 free to be closed when the pressure in the interior of the casing 10' rises sufficiently to produce such closing action.

In this apparatus means also are provided for permitting the valve 52 to be closed when water enters the casing 10', and for this purpose the float 70 is provided, which is preferably received between the arms 59 and 61 of the thermostat strip and is preferably open at the bottom, as already described, in respect to the float 40, and has its upper end in the neighborhood of the lower end of the valve stem 55, but not in contact therewith. Such float is secured to the thermostat as by fastening it to the arm 59 thereof by means of a rivet 71.

When water rises in the chamber 10' the float 70 tends to rise therewith and being secured to the thermostat arm 59, and the latter being pivoted at one side thereof, such rising action, as in the case of the thermostatic action, serves to move the hook portion 58 of the thermostat away from above the stop 56 on the valve stem 55, thus leaving the valve 52 free to be closed against its seat when the water and the water pressure is sufficiently high to cause such closing of said valve.

It will be seen that in this structure, as in that already described, a single valve plate is provided with a vent or vents therein and with valve seats on its opposite faces, and a single valve structure with a stem extending through the plate and with valves on its opposite ends coacting with each of the said valve seats is provided, and that in each case means are provided for preventing the closing of the interior valve while unheated air or vapors are being discharged, and that in one case the interior valve is positively closed, and in the other case is permitted to be closed when the thermostat is expanded by the action of heat or when water enters the chamber, and furthermore that in both cases when the atmospheric pressure is in excess of the interior pressure, and the inner valves are not closed by the action of heat or water, the outer valves are seated and held seated by the difference in pressure and the excess of atmospheric over interior pressure, so that at all times the surrounding gases, as atmospheric air, are prevented from entering the valve casing and thereby getting into the radiator and the other portions of the heating system.

Valves in accordance with my invention are quick and certain in action and entirely automatic and do not require attention after they are installed, and furthermore the valves are always seated and unseated in the same direction and on the same seats, so that there is no tendency or likelihood of valve distortion, even when flat valves are used, which would prevent them from functioning correctly, as may happen when a single valve is used and is seated first against a seat on one side and then against a seat on its opposite side, in which case the seating fit of the valve is likely to be destroyed as it is moved from the seat on one face against the seat on the opposite face.

It is to be understood that the forms of valves and valve mechanism which I have shown in my drawing are for purposes of illustration only and that my invention is not confined thereto, but that changes therein and departures therefrom may be made, within the scope of my claims, by which my invention is defined, and without departing from the spirit of my invention or sacrificing any of its advantages.

Having thus described my invention, I claim:

1. In a radiator pressure regulator, an elongated casing, a valve movable lengthwise thereof, a heat expansible member in said casing extending longitudinally thereof and having a free part movable upon contraction and expansion substantially transversely thereof, and means of connection between said valve and the free part of said member whereby movement transverse of the casing is transformed into movement in a direction substantially longitudinally thereof, substantially as set forth.

2. In a radiator pressure regulator, an elongated casing, a valve movable lengthwise thereof, a substantially U-shaped member of heat expansible material in said casing, supported therein at one end and having its opposite free end movable upon expansion and contraction substantially transversely of said casing, and means of connection between said valve and free end of said member whereby movement transverse of the casing is transformed into movement in a direction substantially lengthwise thereof, substantially as set forth.

3. In a radiator pressure regulator, an elongated casing, a valve movable lengthwise thereof, a heat expansible member in said casing extending longitudinally thereof and having a free part movable upon contraction and expansion substantially transversely thereof, and a bell crank lever between said free part of said member and said valve and loosely connected with said valve and serving to transform movement transverse of the casing into movement substantially lengthwise thereof, substantially as set forth.

4. In a radiator pressure regulator, an elongated casing, a valve movable lengthwise thereof, a substantially U-shaped member of heat expansible material extending lengthwise in said casing, supported therein at one end and having its opposite free end movable upon expansion and contraction substantially transversely of said casing, and a bell crank lever between said free part of said member and said valve and loosely connected with said valve and serving to transform movement transverse of the casing into movement substantially lengthwise thereof, substantially as set forth.

5. In a radiator pressure regulator, an elongated casing, a valve movable substantially lengthwise thereof, a heat expansible member extending longitudinally of the casing and having a free part movable upon expansion and contraction in a direction substantially transverse thereof, means interposed between said free part of said member and said valve for transforming the transverse movement into movement substantially lengthwise of the casing, a float in said casing, and means whereby said float is supported from said heat expansible member, substantially as set forth.

6. In a pressure controlling device, a member provided with a passage for fluid, an inwardly closing valve, an outwardly closing valve, said valves being adapted to control the passage of fluid through the member, means connecting the valves so that one moves toward its closed position when the other moves toward its opened position and vice versa, thermostatic means whereby the outwardly closing valve may be closed when said means is heated, a loose connection being provided between the thermostatic means and the valves for permitting the closing of the outwardly closing valve when the thermostatic means is inoperative, substantially as set forth.

7. In a pressure controlling device, a member provided with a passage for fluid, an inwardly closing valve, an outwardly closing valve, said valves being adapted to control the passage of fluid through the member, means connecting the valves so that one moves toward its closed position when the other moves toward its opened position and vice versa, thermostatic means whereby the outwardly closing valve may be closed when said means is heated, a loose connection being provided between the thermostatic means and the valves for permitting the closing of the outwardly closing valve when the thermostatic means is inoperative, and a float in said member for closing said outwardly closing valve when water is present in said member, substantially as set forth.

8. In a pressure controlling device having a passage for fluid under pressure, a valve to control the passage of fluid inward through the passage, a valve to control the passage of fluid outward through the passage, means connecting the valves, and thermostatically controlled means loosely connected with said connecting means to permit the closing of the valve controlling the outward passage of fluid when the thermostatically controlled means is inoperative, substantially as set forth.

9. In a pressure controlling device having a passage for fluid under pressure. a valve to control the passage of fluid inward through the passage, a valve to control the passage of fluid outward through the passage, means connecting the valves to move them into opposed operative positions, thermostatic means for operating the connecting means and having a loose connection thereto, and a float in said device movable by water to insure the closing of said outwardly closing valve, substantially as set forth.

In testimony that I claim the foregoing, I have hereunto set my hand, this 4th day of August, 1914.

THOMAS W. DAVIS.

Witnesses:
WM. H. CAMFIELD,
M. A. JOHNSON.

Copies of this patent may be obtained for five cents each, by addressing the "Commissioner of Patents, Washington, D. C."